US005535426A

United States Patent [19]
Leigh et al.

[11] Patent Number: 5,535,426
[45] Date of Patent: Jul. 9, 1996

[54] METHOD AND APPARATUS FOR MOVING PRIMARY CONTROL OF A CALL IN A MULTIPLE SITE COMMUNICATION SYSTEM

[75] Inventors: Todd A. Leigh, Rolling Meadows; Michael D. Sasuta, Mundelein; John K. Hefferan, Lombard, all of Ill.

[73] Assignee: Motorola, Inc., Schaumburg, Ill.

[21] Appl. No.: 166,586

[22] Filed: Dec. 13, 1993

[51] Int. Cl.[6] .................................................. H04Q 7/00
[52] U.S. Cl. ...................... 455/34.1; 455/33.1; 455/34.2; 455/54.2; 379/59
[58] Field of Search ................................ 455/34.1, 34.2, 455/33.1, 54.1, 54.2, 56.1, 7, 9, 11.1, 15, 16, 49.1; 379/59

[56] References Cited

U.S. PATENT DOCUMENTS

| | | | |
|---|---|---|---|
| 4,578,815 | 3/1986 | Persinotti | 455/33.4 |
| 5,058,199 | 10/1991 | Grube | 455/54.2 |
| 5,327,573 | 7/1994 | Lenchik et al. | 455/34.2 |

Primary Examiner—Reinhard J. Eisenzopf
Assistant Examiner—Doris To
Attorney, Agent, or Firm—Steven G. Parmelee; Susan L. Lukasik; Daniel C. Crilly

[57] ABSTRACT

Resource controllers (14) within a multisite communication system (20) selectively and automatically assume primary (45) and secondary (53) control modes of operation in order to ensure that adequate communication resources are assigned throughout the system at necessary sites in order to include talk group members that are dispersed throughout the system.

11 Claims, 5 Drawing Sheets

5,535,426

METHOD AND APPARATUS FOR MOVING PRIMARY CONTROL OF A CALL IN A MULTIPLE SITE COMMUNICATION SYSTEM

TECHNICAL FIELD

This invention relates generally to communication systems, and more particularly to communication systems having multiple sites.

BACKGROUND OF THE INVENTION

Various communication systems are well understood in the art. For example, the Smartnet trunked radio communication system as manufactured and sold by Motorola, Inc. allows a relatively small number of radio communication resources to be flexibly allocated amongst a considerably larger number of radio users.

In many such systems, groups, of users having common communication interests are grouped into talk groups. For example, a fleet of delivery vans might be arranged as a first talk group, and a fleet of cement delivery trucks might be grouped as a second talk group. These radios would be programmed with appropriate talk group affiliation information, and that same information would be stored for use by a resource controller. So configured, when a member of a particular talk group initiates a communication, the resource controller, in addition to allocating an appropriate communication resource to support the communication, will also utilize the talk group affiliation information to ensure that other relevant talk group members become a part of the communication as well.

Some particularly large communication systems have multiple sites. Each site typically includes a resource controller and a set of communication resources that are assignable to service communication units within the coverage area that is serviced by that particular site. So configured, in order to support a communication involving members of a common talk group that are themselves distributed over two or more sites, a communication resource must be assigned at each site. To date, in such systems as the Smartzone communication system as manufactured and sold by Motorola, Inc., a central resource controller has been utilized to control the assignment activities of the resource controllers located at each site. For many applications, this configuration provides excellent service. There may be other situations, however, where such centralized control may be less desirable.

Accordingly, a need exists for an alternative way to ensure talk group participation across multiple sites.

DESCRIPTION OF A PREFERRED EMBODIMENT

In accordance with the invention, a multisite communication system is configured such that a communication resource controller for a particular site, upon receiving a request for communication services, determines whether that request requires use of communication resources in at least one other site in the system. When multiple sites are so required, the initiating communication resource controller functions as a primary controller to support the request for service. As primary controller, this communication resource controller instructs the communication resource controllers for other required sites to allocate a communication resource within their site to support the call. In one embodiment, the communication resource controller functioning as a primary controller can also determine that primary control for the call should be moved to another site to better facilitate continuing support for the call. For example, if a communication unit other than the communication unit that originally initiated the call begins to source an audio transmission at another site, primary control can be moved to that site.

Figure 1:
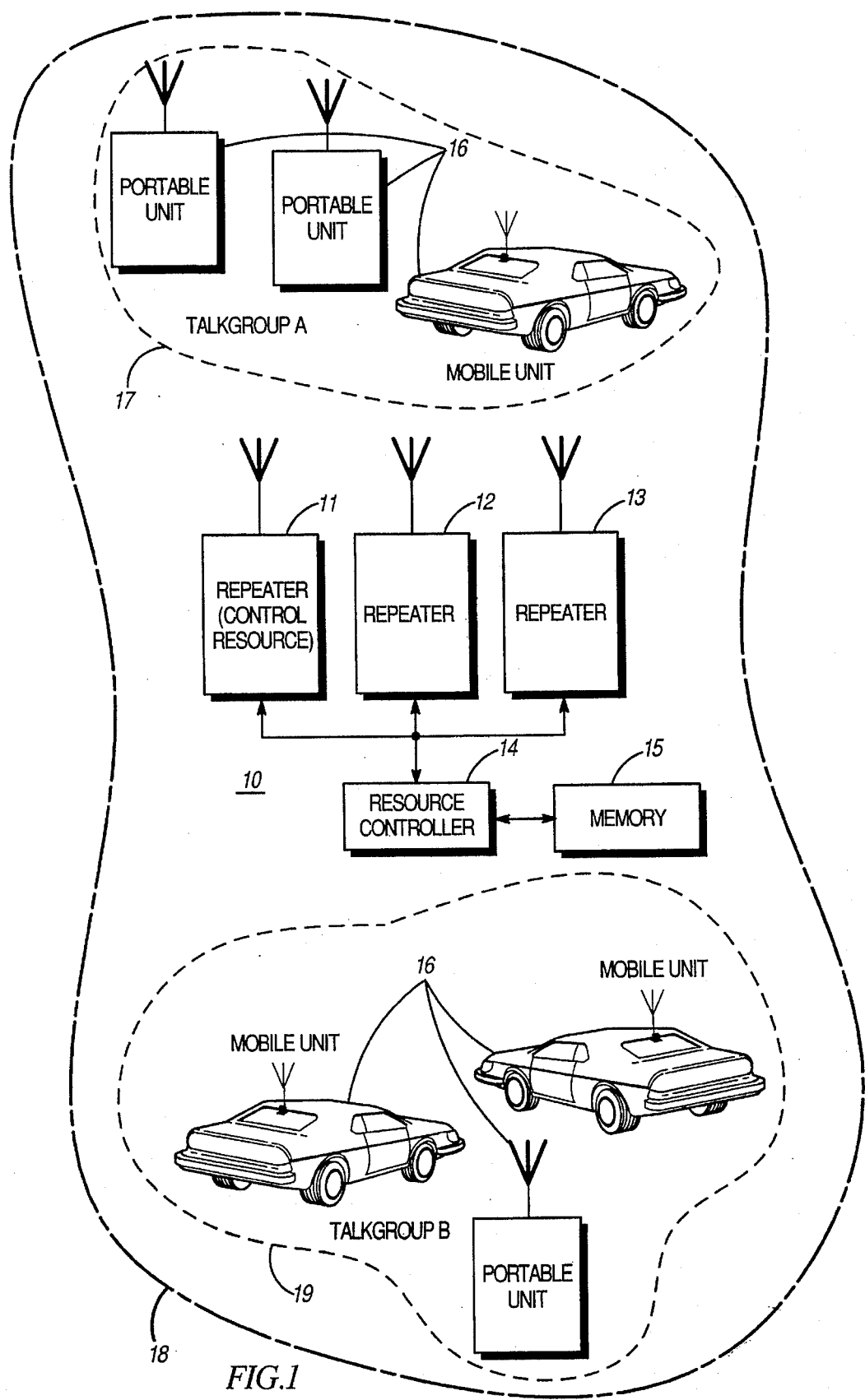
FIG. 1 comprises a block diagram depiction of representative elements within a site.

Referring now to FIG. 1, the general system components found at a given site will be described. The system infrastructure (10) includes a number of repeaters (11–13) (in this example, three in number). Typically, from one to twenty-eight (or more) such repeaters are provided at any given site to accommodate anticipated communication needs. Often, one of the repeaters (11) functions as a control resource that the system utilizes to transceive control information with subscribers that are serviced by the system. The repeaters (11–13) are operably coupled to a resource controller (14) that functions to assign and control the operation of the repeaters (11–13) to facilitate the servicing of communication service requests. The resource controller (14) typically couples to some memory (15) where information relevant to the functioning of the system can be stored. For example, the memory (15) can be used to store talk group affiliation information.

The above generally referred to infrastructure elements are all well understood in the art, and hence a more detailed description need not be provided here. It should be understood in particular that the resource controller (14) comprises a computational platform that can be additionally programmed to operate as described below in accordance with the invention.

The above described infrastructure elements (10) provide two way radio communication services within a corresponding coverage area (18). In that coverage area (18) at any given time will typically be a number of two way communication units (16). These communication units (16) can be portable units, mobile units, or fixed location units, all as well understood in the art. Many of these communication units (16) will be organized into talk groups. Typically, to facilitate this, the communication units (16) will be programmed to include a talk group identifier in addition to a unique personal identifier. In the example depicted, three of the communication units (16) have been preorganized into talk group A (17) and a second grouping of communication units (19) has been identified as talk group B.

Figure 2:
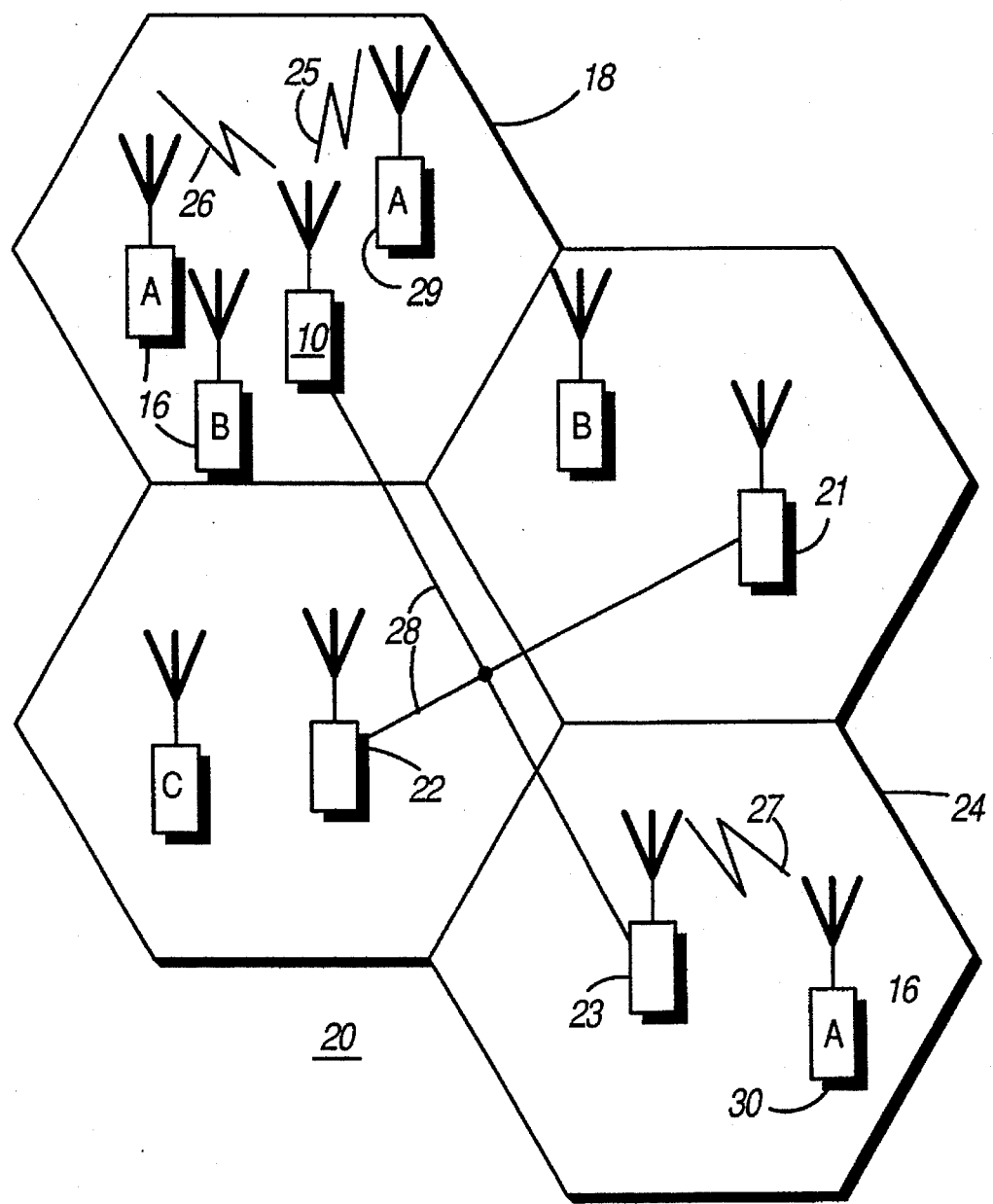
FIG. 2 comprises a block diagram depiction of a four site system.

Referring now to FIG. 2, the above described infrastructure elements (10) may be replicated many times over in a multisite communication system (20) as depicted. For example, the above described infrastructure elements (10) continue to serve its corresponding coverage area (18), with other similar infrastructure installations (21-23) being positioned to serve other coverage areas, some of which may be contiguous with one another, and some of which may overlap or be discontinuous with respect to one another.

The resource controllers of each site are coupled to one another via an appropriate communications medium (28). This medium (28) can be either wireline or wireless, and may be dedicated or constitute an on-demand resource, all as well understood in the art. Using this medium (28), the resource controllers of the various sites share information regarding communication units that are located within their respective coverage areas, and can further exchange resource allocation instructions, as described below in more detail. (It will be useful to the reader to note that no central controller has been provided to manage the overall functioning of the resource controllers in this embodiment. Rather, overall resource allocation on a system-wide basis is to be managed in a dynamic manner described below.)

For purposes of this example, it will be presumed that a number of communication units (16) are distributed throughout the system. In particular, two of the communication units (16) that belong to talk group A are found within a first coverage area (18) served by a first site (10) and a third communication unit (16) belonging to talk group A is found within a second coverage area, (24) being serviced by a second site (23).

At such time as a communication unit (29) within the first coverage area (18) transmits a service request (25), the resource controller for the first coverage area (18) determines the talk group affiliation for the requesting communication unit (29), and determines whether resources within other sites must be utilized in order to fully service the request. To accomplish this, the resource controller must determine whether any target talk group members are located in sites other than the site containing the originating communication unit. In this example, one such communication unit (30) so exists, and is found within the second coverage area (24) noted above. (The above determination can be accomplished in one of at least two ways. In one embodiment, the resource controllers for each site can constantly exchange information with one another via the interconnecting medium (28) as to which communication units are located in which sites. Pursuant to this embodiment, the originating resource controller would access its own memory to determine which communications were at what locations throughout the system. In another embodiment, upon receiving a service request, the originating resource controller could communicate at that time with the other sites to effectively poll for relevant location information. Both of these communication techniques are generally understood in the art.)

In this example, the originating resource controller will determine that a communication resource must be made available within the second coverage area (24) in order to support the requested call. Therefore, in addition to assigning a communication resource (26) within its own coverage area (18), the originating resource controller will function as a primary controller, and instruct the resource controller for the second site to allocate a resource within the second coverage area (24). Presuming that such a resource is available, the second resource controller will function as a secondary controller, and assign a local communication resource (27) to thereby allow the target talk group member located within the distant coverage area (24) to participate in the call.

Figure 3:
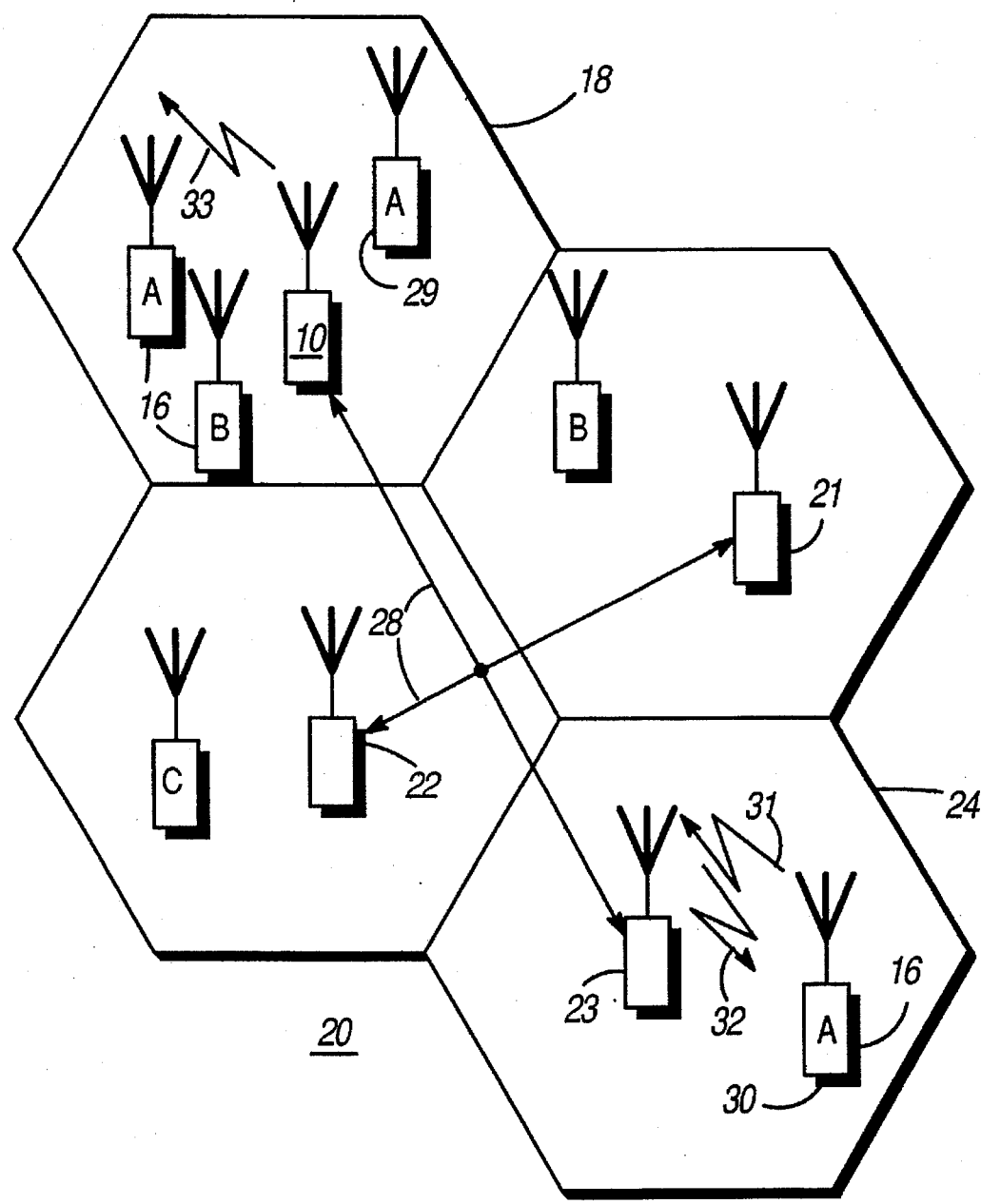
FIG. 3 comprises a block diagram depiction of a four site system.

Continuing with this example, and referring now to FIG. 3, the originating communication unit (29) will eventually,y conclude its transmissions. If no other communications relevant to that original transmission occur, then the call concludes and the communication resources that were assigned to support the call are deassigned and made available to support other service requests as they arise. Other communication units, however, may respond to the initial transmission. To the extent the responding communication units are found in the original coverage area (18), the above described configuration of resource allocations and control responsibilities need not change. The resources as previously assigned and the control responsibilities as previously assumed will continue to adequately support the call. If, however, a responding communication unit is found other than in the initial coverage area (18), the system will automatically reconfigure responsibility for control of the call.

In particular, assuming for purposes of this example that the distant talk group member (30) transmits a response (31), the resource controller for the second coverage area (24) notifies the originating resource controller that such a response is pending. At this point, the originating resource controller determines that primary responsibility for control of the call should now be moved to the second site, and the resource controllers communicate between themselves to accomplish this move of responsibility. Accordingly, the second resource controller becomes the primary controller for this particular call, and the original resource controller assumes a roll as a secondary controller. The second resource controller assigns a resource (32) within its own coverage area (24) to support the continuation of the call, and instructs the original site (10) to assign a resource (33) within the first coverage area (18) to likewise continue support for the call.

So configured, the resource controllers for various sites within a multisite communication system are capable of managing resource allocations throughout the system without need for a discrete point of central control. In many instances, this can result in reduced costs for overall infrastructure, and can also simplify, under some circumstances, the subsequent addition of new sites, or reconfiguration of existing sites, in a multisite communication system.

Figure 4:
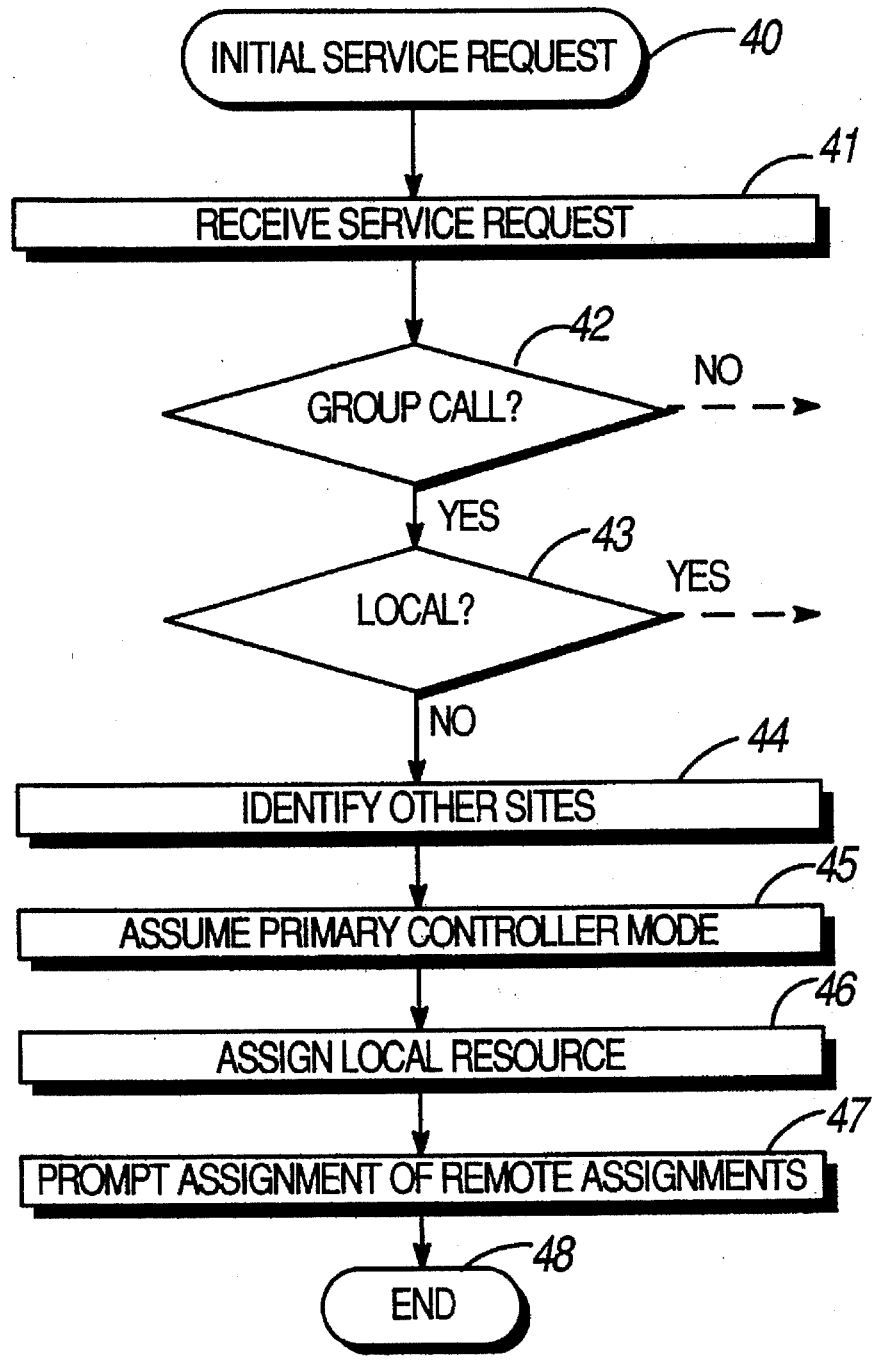
FIG. 4 comprises a flow diagram depicting operation in accordance with the present invention.
Figure 5:
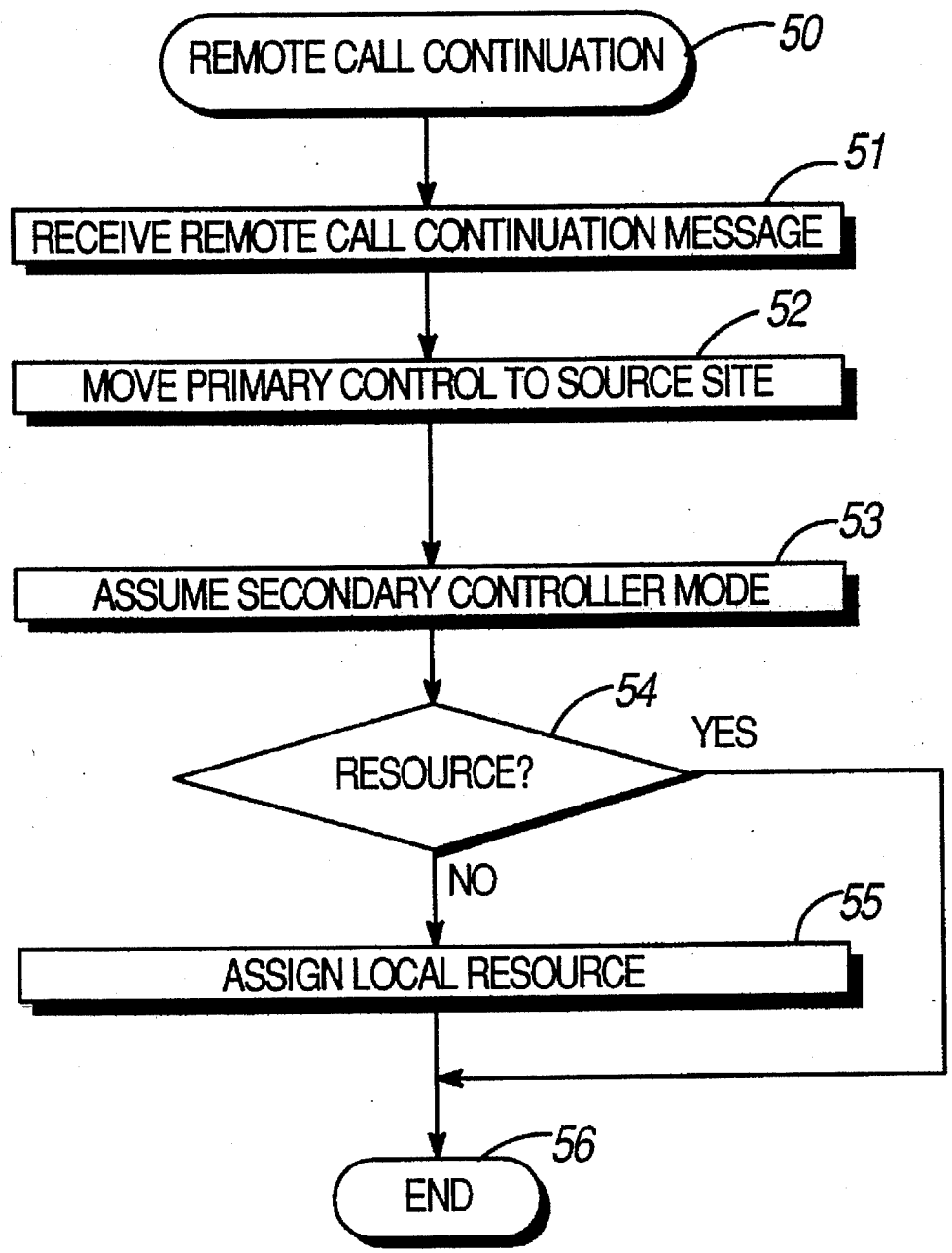
FIG. 5 comprises a flow diagram depicting operation in accordance with the invention.

Referring now to FIG. 4, a flow diagram describing the initial service request process (40) will be described. Upon receiving a service request (41), the resource controller determines whether the request constitutes a group call communication (42). If not, the resource controller proceeds to service the request in accordance with the specific type of request made (for example, a telephone interconnect communication or a point-to-point private call, all in accordance with well understood prior art technique). When the request does constitute a group call (42), the resource controller determines whether the request can be completely serviced on a local basis (43). If true, the resource controller services the request in accordance with well understood prior art technique. If non-local resources must be utilized, however, the resource controller identifies the other required sites (44) and assumes a primary controller mode of operation (45). The resource controller then assigns a local resource (46) to support the request and communicates with other resource controllers servicing the other required site or sites to cause these other resource controllers to assign necessary resources at the distant sites in order to service the request (47). This concludes (48) the initial service request process (40).

To the extent that the communication continues beyond the initial transmission, the resource controller continues with a remote call continuation process (50). Upon receiving a remote call continuation message from a resource controller that has itself received (51) such a request from a talk group member within a corresponding coverage area, the resource controller determines that primary control for the call should be moved to the site that now sources the continuation request, and primary control is so moved (52). The resource controller then assumes a secondary controller mode of operation (53). In this mode of operation, the resource controller receives instruction from the new primary controller to assign a local resource. Presuming that a local resource is available (54), the resource controller assigns a local resource (55) to support the continued call. This concludes the remote call continuation process (50).

When the call eventually concludes, whichever resource controller is then acting as a primary controller can command all of the resource controllers that are acting as secondary controllers to cease processing the call.

The benefits of this mode of operation should be clear. Without need for dedicated central controlling infrastructure, the resource controllers servicing the various sites of a multisite communication system flexibly cooperate amongst themselves to assure that adequate communication resources are made available throughout the system to support a call involving distributed talk group members. So configured, at any given moment, one of the resource controllers will act as a primary controller, and all other resource controllers that are supporting that call will act as secondary controllers.

We claim:

1. A method comprising the steps of:

receiving, by a communication resource controller in a first site of a plurality of sites that comprise a communication system, a communication service request from a communication unit;

determining, by the communication resource controller, that the communication service request requires use of a communication resource in a second site of the plurality of sites;

initiating, by the communication resource controller while acting as a primary controller, a call to support the communication service request;

determining, by the communication resource controller, that primary control of the call should be moved from the first site; and moving, by the communication resource controller, primary control of the call to the second site to continue supporting the call.

2. The method of claim 1, wherein the communication service request comprises a wide area communication service request.

3. The method of claim 1, wherein the step of initiating the call to support the communication service request includes causing the second site to assign the communication resource to support the call in the second site.

4. The method of claim 1, wherein the step of determining that primary control of the call should be moved includes the step of determining that at least one communication unit serviced within the second site has requested service constituting continuation of the call.

5. A communication system that includes a plurality of communication resource controllers, comprising:

a) a first communication resource controller that controls allocation of communication resources in a first site, wherein the first communication resource controller selectively supports calls as a primary controller and as a secondary controller;

b) a second communication resource controller that controls allocation of communication resources in a second site, wherein the second communication resource controller selectively supports calls as a primary controller and as a secondary controller, and wherein when the first communication resource controller is supporting a call as a primary controller, the second communication resource controller is supporting the call as a secondary controller; and c) a communication link coupling the first communication resource controller and the second communication resource controller, wherein the communication link provides a medium through which the first communication resource controller instructs the second communication resource controller to allocate a communication resource in the second site to support the call.

6. The communication system of claim 5, wherein when any one communication resource controller of the plurality of communication resource controllers acts as a primary controller for a particular call, all remaining communication resource controllers of the plurality of communication resource controllers that are also supporting the particular call act as secondary controllers.

7. In wide coverage area, multiple site radio communication system, a method comprising the steps of:

at a firs communication resource controller in a first site within the communication system:

receiving a service request from a communication unit seeking to make a call;

determining that the service request requires use of communication resources in at least a second site of the radio communication system in order to include at least one target communication unit;

while acting as a primary controller, initiating a call to support the service request by at least causing a second communication resource controller at the second site to allocate a communication resource to support the call;

determining that primary control of the call should be moved to the second communication resource controller in the second site to continue supporting the call;

moving primary control of the call to the second communication resource controller in the second site to continue supporting the call.

8. The method of claim 7 wherein the step of determining that primary control of the call should be moved includes the step of determining that the at least one target communication unit has requested service constituting continuation of the call.

9. A method comprising the steps of:

receiving, by a communication resource controller in a first site of a plurality of sites that comprise a communication system, a communication service request from a communication unit;

determining, by the communication resource controller, that the communication service request requires use of a communication resource in a second site of the plurality of sites;

initiating, by the communication resource controller while acting as a primary controller, a call to support the communication service request;

determining, by the communication resource controller, that primary control of the call should be moved from the first site; and moving, by the communication resource controller, primary control of the call to a third site of the plurality of sites to continue supporting the call.

10. The method of claim 9, wherein the step of initiating the call to support the communication service request includes causing the second site to assign the communication resource to support the call in the second site.

11. The method of claim 9, wherein the step of determining that primary control of the call should be moved includes the step of determining that at least one communication unit serviced within the third site has requested service constituting continuation of the call.

* * * * *